(12) United States Patent
Chen et al.

(10) Patent No.: US 10,330,539 B2
(45) Date of Patent: Jun. 25, 2019

(54) HIGH PRECISION HIGH RELIABILITY AND QUICK RESPONSE THERMOSENSITIVE CHIP AND MANUFACTURING METHOD THEREOF

(71) Applicant: EXSENSE ELECTRONICS TECHNOLOGY CO., LTD, Zhaoqing (CN)

(72) Inventors: Wenting Chen, Zhaoqing (CN); Zhaoxiang Duan, Zhaoqing (CN); Jun Yang, Zhaoqing (CN); Qixing Bai, Zhaoqing (CN); Limin Tang, Zhaoqing (CN); Jiankai Ye, Zhaoqing (CN)

(73) Assignee: EXSENSE ELECTRONICS TECHNOLOGY CO., LTD (CN)

( * ) Notice: Subject to any disclaimer, the term of this patent is extended or adjusted under 35 U.S.C. 154(b) by 90 days.

(21) Appl. No.: 15/328,993

(22) PCT Filed: Jul. 23, 2015

(86) PCT No.: PCT/CN2015/084974
§ 371 (c)(1),
(2) Date: Jan. 25, 2017

(87) PCT Pub. No.: WO2016/015594
PCT Pub. Date: Feb. 4, 2016

(65) Prior Publication Data
US 2017/0211991 A1    Jul. 27, 2017

(30) Foreign Application Priority Data
Jul. 30, 2014    (CN) .......................... 2014 1 0371079

(51) Int. Cl.
*G01K 7/01* (2006.01)
*G01K 7/16* (2006.01)
(Continued)

(52) U.S. Cl.
CPC ............... *G01K 7/16* (2013.01); *H01C 1/022* (2013.01); *H01C 1/14* (2013.01); *H01C 13/02* (2013.01)

(58) Field of Classification Search
CPC ... G01K 7/01; G01K 7/15; G01K 7/16; H01L 2924/15787; H01L 2223/54473;
(Continued)

(56) References Cited

U.S. PATENT DOCUMENTS 3,457,615 A * 7/1969 Ikeda .................. H01G 4/30
29/25.42
3,568,125 A * 3/1971 Villemant ............ H01C 7/041
257/467
(Continued)

FOREIGN PATENT DOCUMENTS

CN    1624819 A    6/2005
CN    102034580 A    4/2011
(Continued)

OTHER PUBLICATIONS

International Search Report dated Oct. 10, 2015 for PCT/CN2015/084974; International Filing Date: Jul. 23, 2015; 3 pgs.

*Primary Examiner* — Gail Kaplan Verbitsky
(74) *Attorney, Agent, or Firm* — Schmeiser, Olsen & Watts, LLP

(57) ABSTRACT

A high precision high reliability and quick response thermosensitive chip and manufacturing method thereof is provided, including a thermosensitive ceramic semiconductor substrate; glass protective layers are alternately spray-coated and sintered on the two surfaces of the thermosensitive ceramic semiconductor substrate; and the two surfaces of the thermosensitive ceramic semiconductor substrate having the glass protective layers are printed with metal electrode layers. The thermosensitive chip achieves quick response, accurate control of resistance precision and has high preci-
(Continued)

sion; in addition, the glass protective layers thereof enable the thermosensitive chip to have high reliability.

9 Claims, 8 Drawing Sheets

(51) Int. Cl.
*H01C 1/022* (2006.01)
*H01C 1/14* (2006.01)
*H01C 13/02* (2006.01)

(58) Field of Classification Search
CPC ... H01L 2223/5448; H01L 2224/05554; H01L 23/3121; H01L 25/0657; H01L 2924/14
USPC .................................................. 374/178, 185
See application file for complete search history.

(56) References Cited

U.S. PATENT DOCUMENTS

| | | | | | |
|---|---|---|---|---|---|
| 3,839,783 | A | * | 10/1974 | Dankert | H01C 1/1406 264/272.17 |
| 4,071,880 | A | * | 1/1978 | Rutt | H01G 4/302 361/309 |
| 4,507,643 | A | * | 3/1985 | Sunano | G01N 27/12 338/34 |
| 4,776,978 | A | * | 10/1988 | Herron | B22F 1/0059 252/500 |
| 4,831,432 | A | * | 5/1989 | Hori | H01C 1/1406 257/43 |
| 4,952,902 | A | * | 8/1990 | Kawaguchi | H01C 7/042 252/516 |
| 4,993,142 | A | * | 2/1991 | Burke | H01C 7/043 29/411 |
| 5,160,912 | A | * | 11/1992 | Burke | H01C 7/043 338/22 R |
| 5,210,516 | A | * | 5/1993 | Shikama | H01C 1/024 338/22 R |
| 6,472,249 | B1 | * | 10/2002 | Kuwabara | H01L 21/56 257/E21.502 |
| 8,624,703 | B2 | * | 1/2014 | Miura | H01C 7/008 338/22 R |
| 9,786,612 | B2 | * | 10/2017 | Yu | H01L 25/0657 |
| 2003/0160042 | A1 | * | 8/2003 | Hiramatsu | H01L 21/67103 219/444.1 |
| 2004/0012098 | A1 | * | 1/2004 | Yamazaki | H01L 21/561 257/778 |
| 2007/0262716 | A1 | * | 11/2007 | Kifune | H01J 9/02 313/582 |
| 2008/0153378 | A1 | * | 6/2008 | Fujio | H01J 9/242 445/24 |
| 2010/0129988 | A1 | * | 5/2010 | Ootake | C09J 7/38 438/464 |
| 2010/0279468 | A1 | * | 11/2010 | Ootake | B32B 7/10 438/113 |
| 2012/0028414 | A1 | * | 2/2012 | Yonehara | H01L 21/6835 438/109 |
| 2012/0187544 | A1 | * | 7/2012 | Yamashita | H01L 22/32 257/620 |
| 2014/0153613 | A1 | * | 6/2014 | Wienand | G01K 7/18 374/185 |
| 2015/0079401 | A1 | * | 3/2015 | Ohno | C08K 3/28 428/416 |
| 2017/0280559 | A1 | * | 9/2017 | Nakajima | B28B 11/243 |

FOREIGN PATENT DOCUMENTS

| | | | |
|---|---|---|---|
| CN | 102052972 | A | 5/2011 |
| CN | 102627446 | A | 8/2012 |
| CN | 104198079 | A | 12/2014 |
| DE | 003718197 | A1 * | 12/1987 |
| JP | 09195302 | * | 7/1985 |
| JP | 05085848 | A * | 4/1993 |
| JP | H0851002 | A | 2/1996 |
| JP | 08122118 | A * | 5/1996 |
| JP | 10208628 | A * | 8/1998 |
| WO | WO2013017531 | A1 | 2/2013 |

* cited by examiner

HIGH PRECISION HIGH RELIABILITY AND QUICK RESPONSE THERMOSENSITIVE CHIP AND MANUFACTURING METHOD THEREOF

CROSS-REFERENCE TO RELATED APPLICATIONS

This application claims priority to PCT Application No. PCT/CN2015/084974, having a filing date of Jul. 23, 2015, based off of Chinese Application No. 2014 1037 1079.9 having a filing date of Jul. 30, 2014, the entire contents of both which are hereby incorporated by reference.

FIELD OF TECHNOLOGY

The following relates to the technical field of thermosensitive chip products, in particular to a high precision high reliability and quick response thermosensitive chip and manufacturing method thereof.

BACKGROUND

The development of electronic technology enables the electronic components to develop towards higher precision, higher reliability, quicker response and miniaturization. The Surface Mounting Technology (SMT) technology increasingly requires the surface mounting of the electronic components. Thermosensitive chip as an electronic component has unparalleled advantages: easy installation, high efficiency, no wire lead thereby no parasitic inductance, and electrodes disposed in the epoxy or glass encapsulation layer thereby gaining a higher reliability.

Thermistors and temperature sensors, with thermosensitive chips being the key components and with different encapsulation modes, are widely used in temperature detection circuit, temperature compensation circuit and temperature control circuit. The thermosensitive chips play a key role in transforming the temperature variables into the required electronic signals.

The widespread use of thermosensitive chips requires them to be of high precision, high reliability and quick response so as to cater for people's needs for experiencing the electronic technology.

In the known art, the manufacturing method of thermosensitive chips is as follows: to prepare a thermosensitive ceramic semiconductor substrate, then to print the metal electrode layers, and to cut up the thermosensitive chips. The thermosensitive chips made by such method have the following defects:

(1) The response is not quick enough: For the existing thermosensitive chips that can weld the CP wire and enameled wire or can test the resistance value, their response time is more than 2 seconds, which is too long.

(2) It is difficult to control the precision of the resistance value. While cutting up the thermosensitive chips by semiconductor cutting-up technique, the smaller the cutting-up size is, the greater the resistance value error is and the more difficult to test the resistance value of thermosensitive chips.

SUMMARY

An aspect relates to a high precision high reliability and quick response thermosensitive chip which can achieve quick response, accurate control of resistance precision and has high precision; in addition, the glass protective layers thereof enable the thermosensitive chip to have high reliability.

To fulfill the above objective, the following technical solution is employed:

A high precision high reliability and quick response thermosensitive chip, comprising a thermosensitive ceramic semiconductor substrate, wherein glass protective layers are spray-coated and sintered alternately on the two surfaces of the thermosensitive ceramic semiconductor substrate, and the two surfaces of the thermosensitive ceramic semiconductor substrate having the glass protective layers are printed with metal electrode layers.

Further, the glass protective layers are disposed alternately, and the glass protective layers on the two surfaces of the thermosensitive ceramic semiconductor substrate are disposed correspondingly.

Further, the metal electrode layers are gold or silver electrodes.

The following also provide a manufacturing method of the high precision high reliability and quick response thermosensitive chip, comprising the following steps:

(1) to make a thermosensitive ceramic semiconductor substrate;

(2) to spray-coat the glass protective layers: to spray-coat correspondingly the two surfaces of the thermosensitive ceramic semiconductor substrate with glass liquid that made of glass powder to form glass protective layers; the glass protective layers are disposed alternately on each of the surfaces of the thermosensitive ceramic semiconductor substrate;

(3) to sinter the glass protective layers: to sinter the thermosensitive ceramic semiconductor substrate that is spray-coated with glass protective layers;

(4) to print the metal electrode layers: to print metal paste and sinter the metal paste into metal electrode layers on the two surfaces of the thermosensitive ceramic semiconductor substrate having glass protective layers;

(5) slice: slice the thermosensitive ceramic semiconductor substrate having glass protective layers and metal electrode layers into square pieces according to the prescribed size;

(6) to acquire thermosensitive chips.

Further, step (2) to spray-coat glass protective layers comprises:

(2a) to mount: to mount the thermosensitive ceramic semiconductor substrate on a shielding bar in order to isolate the area that doesn't need to be spray-coated with glass;

(2b) to spray-coat glass: using a sprayer to spray-coat evenly the upper and lower surfaces of the mounted thermosensitive ceramic semiconductor substrate with prepared glass liquid that made of glass powder evenly.

Further, step (3) to sinter glass protective layers comprises: to remove the shielding bar, to sinter the spray-coated thermosensitive ceramic semiconductor substrate at a temperature to melt the glass powder, so that the glass and thermosensitive ceramic semiconductor substrate are tightly bonded. Specifically, the sintering temperature range of the glass protective layers is 600~650° C.

Further, step (4) to print metal electrode layers comprises:

(4a) to print metal paste: using printing machine to print metal paste evenly on upper and lower surfaces of the thermosensitive ceramic semiconductor substrate having glass protective layers;

(4b) to sinter metal electrode layers: to sinter at a temperature such that the metal electrode layers are closely bonded to the glass protective layers and thermosensitive semiconductor ceramic layer. The sintering temperature of the metal electrode layers is 950~1100° C.

Compared with the known art, embodiments of the present invention has the following beneficial effects:

(1) Quick response. Glass protective layers are disposed alternately on the surfaces of the thermosensitive ceramic semiconductor substrate which separate the surfaces of the thermosensitive substrate into a non-conductive region with the glass protective layer and a conductive region without glass protective layer. When the thermosensitive chip is charged with electricity, the current runs through the conductive region quickly and avoids the non-conductive region (that is, the current need not to run through the whole area of the chip). Meanwhile, as long as the conductive region of the thermosensitive chip sensing the ambient temperature, the thermosensitive chip will quickly respond and show its resistance value.

(2) High precision. The thermosensitive chip of embodiments of the present invention can avoid the situation where the smaller the cutting-up size is, the greater the resistance value error is. Increasing the size of the thermosensitive chip can facilitate the testing of resistance value using equipment, thereby effectively improving the resistance precision.

(3) High reliability. With the protection of glass protective layers, the thermosensitive chip of embodiments of the present invention can achieve high reliability.

BRIEF DESCRIPTION

Some of the embodiments will be described in detail, with reference to the following figures, wherein like designations denote like members, wherein.

DETAILED DESCRIPTION

Figure 1:
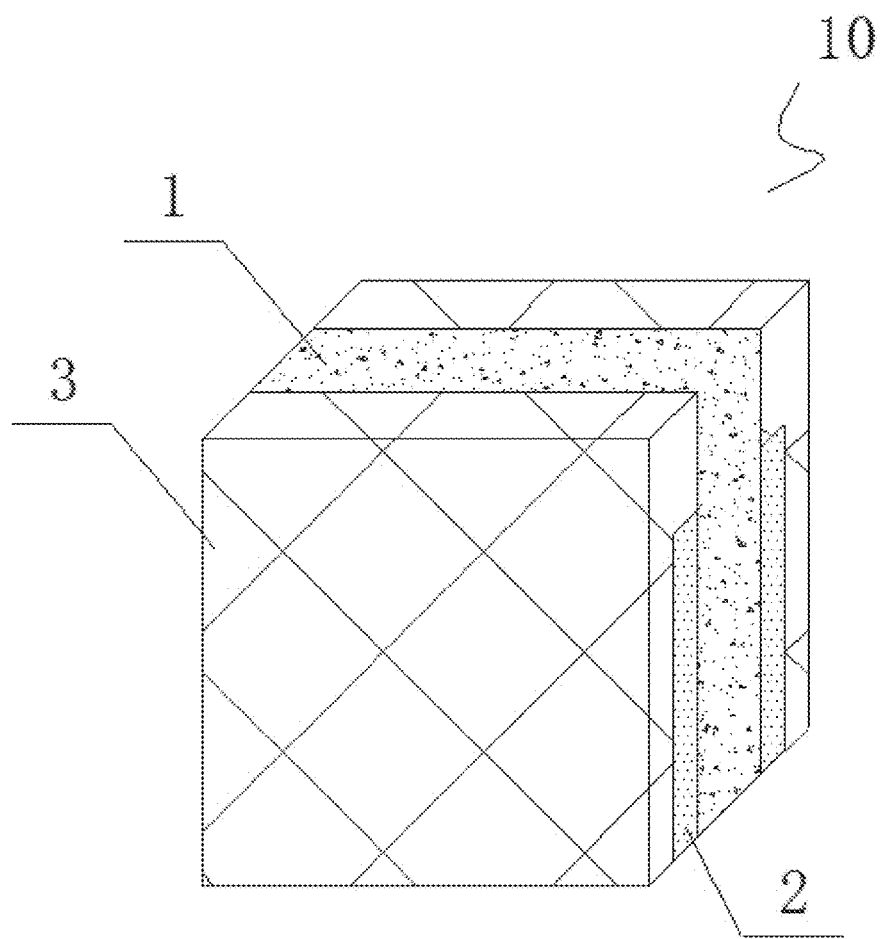
FIG. 1 is a three-dimensional view of the thermosensitive chip of embodiments of the present invention.
Figure 2:
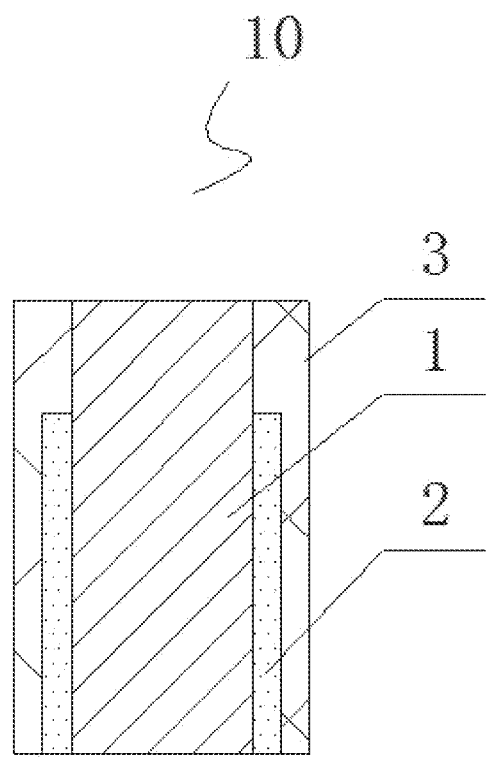
FIG. 2 is a side sectional view of the thermosensitive chip of embodiments of the present invention.

Referring to FIG. 1 and FIG. 2, the high precision high reliability and quick response thermosensitive chip 10 of embodiments of the present invention, comprising a thermosensitive ceramic semiconductor substrate 1, wherein glass protective layers 2 are spray-coated and sintered alternately on the two surfaces of the thermosensitive ceramic semiconductor substrate 1. The two surfaces of the thermosensitive ceramic semiconductor substrate 1 having the glass protective layers 2 are printed with metal electrode layers 3. The glass protective layers 2 are spaced apart in bars. The glass protective layers 2 on the two surfaces of the thermosensitive ceramic semiconductor substrate 1 are disposed correspondingly. The metal electrode layers 3 are gold or silver electrode layers.

Figure 3A:
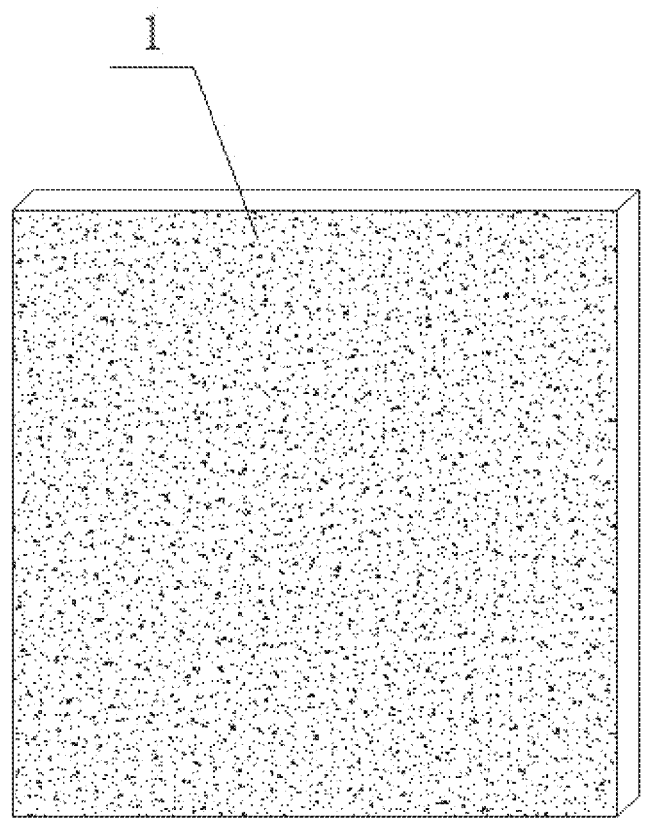
FIGS. 3A to 3F are the flow charts of the manufacturing process of the thermosensitive chip of embodiments of the present invention.

The following also provides a manufacturing method of the high precision high reliability and quick response thermosensitive chip, the specific steps of which are:

(1) to make a thermosensitive ceramic semiconductor substrate 1; in this step, the thermosensitive ceramic semiconductor substrate can be made by the traditional ceramic semiconductor process, which flows from preparing ingredients to powdering, isostatic pressing powdering, sintering into dense semiconductor ceramic blocks, cutting semiconductor ceramic blocks and to forming the thermosensitive ceramic semiconductor substrate 1 (as shown in FIG. 3A).

Figure 3B:
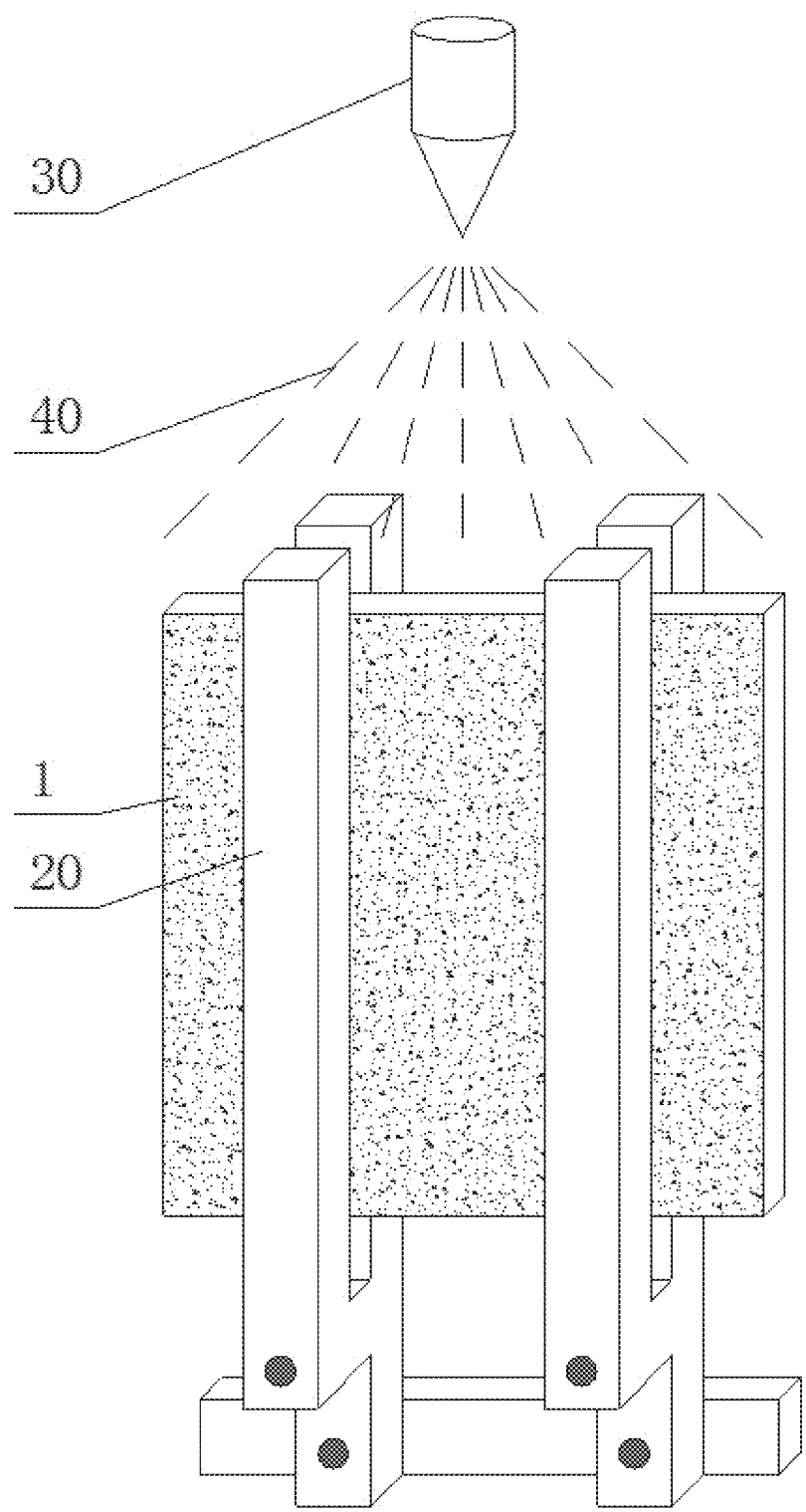

(2) to spray-coat glass protective layers 2; as shown in FIG. 3B, (2a) Mount: the thermosensitive ceramic semiconductor substrate 1 is mounted on a shielding bar 20 in order to isolate the area that doesn't need to be spray-coated.

(2b) spray-coat glass: using a sprayer to spray-coat the upper and lower surfaces of the properly mounted thermosensitive ceramic semiconductor substrate 1 with prepared glass liquid that made of glass powder evenly.

Therefore, glass protective layers 2 are formed on the two surfaces of the thermosensitive ceramic semiconductor substrate 1. The glass protective layers 2 on each of the surfaces of the thermosensitive ceramic semiconductor substrate 1 are disposed alternately, therefore separating each of the surfaces of the thermosensitive ceramic semiconductor substrate 1 into a non-conductive region with the glass protective layer 2 and a conductive region without glass protective layer.

Figure 3C:
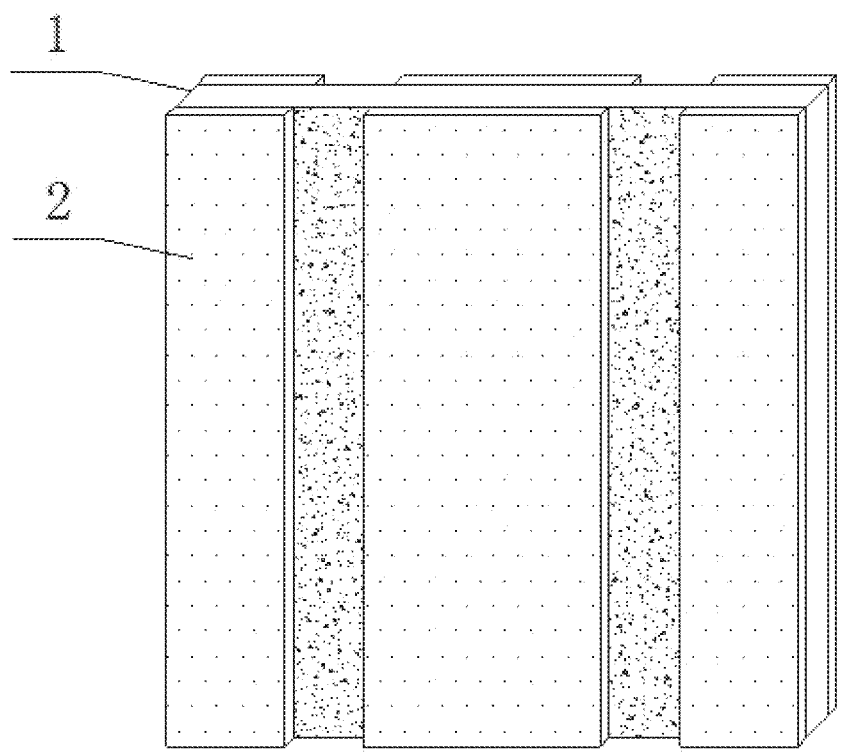

(3) to sinter glass protective layers 2; after removing the shielding bar 20, as shown in FIG. 3C, the spray-coated thermosensitive ceramic semiconductor substrate 1 is sintered under 600~650° C. to melt the glass powder, so that the glass and thermosensitive ceramic semiconductor substrate 1 are tightly bonded.

Figure 3D:
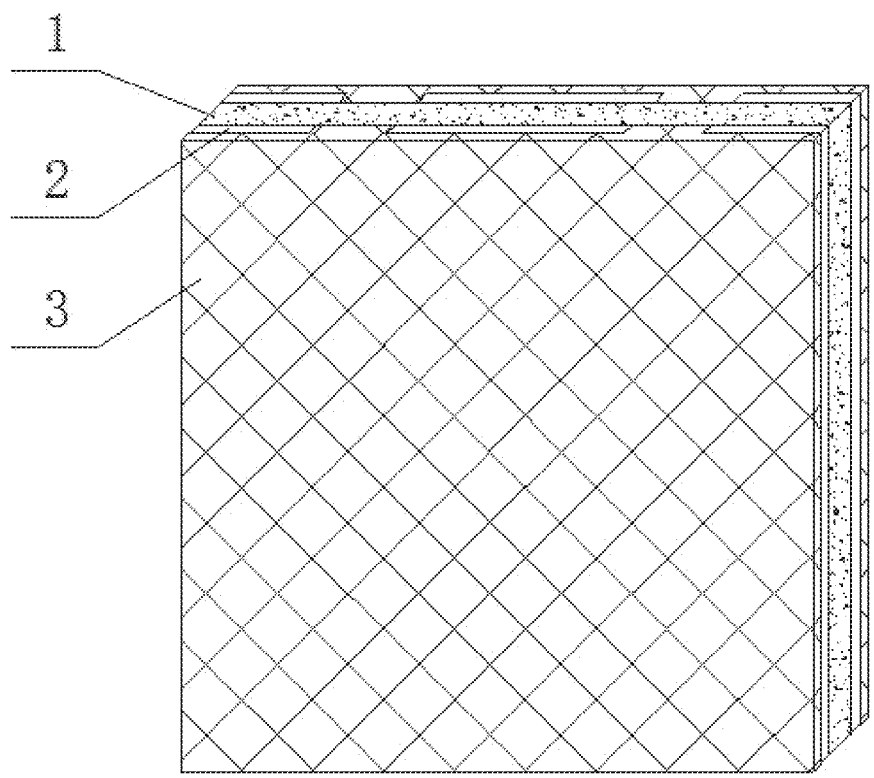

(4) to print metal electrode layers 3; as shown in FIG. 3D, to print metal paste and sinter the metal paste to form metal electrode layers 3 on the two surfaces of the thermosensitive ceramic semiconductor substrate 1 having glass protective layers 2. Specifically, (4a) to print metal paste: using printing machine to print the metal paste evenly on the upper and lower surfaces of the thermosensitive ceramic semiconductor substrate 1 having glass protective layers 2.

(4b) sinter metal electrode layers 3: sinter at a temperature such that the metal electrode layers 3 are closely bonded to the glass protective layers 2 and the ceramic layer of the thermosensitive ceramic semiconductor substrate 1. The sintering temperature of the metal electrode layers 3 is 950~1100° C.

Figure 3E:
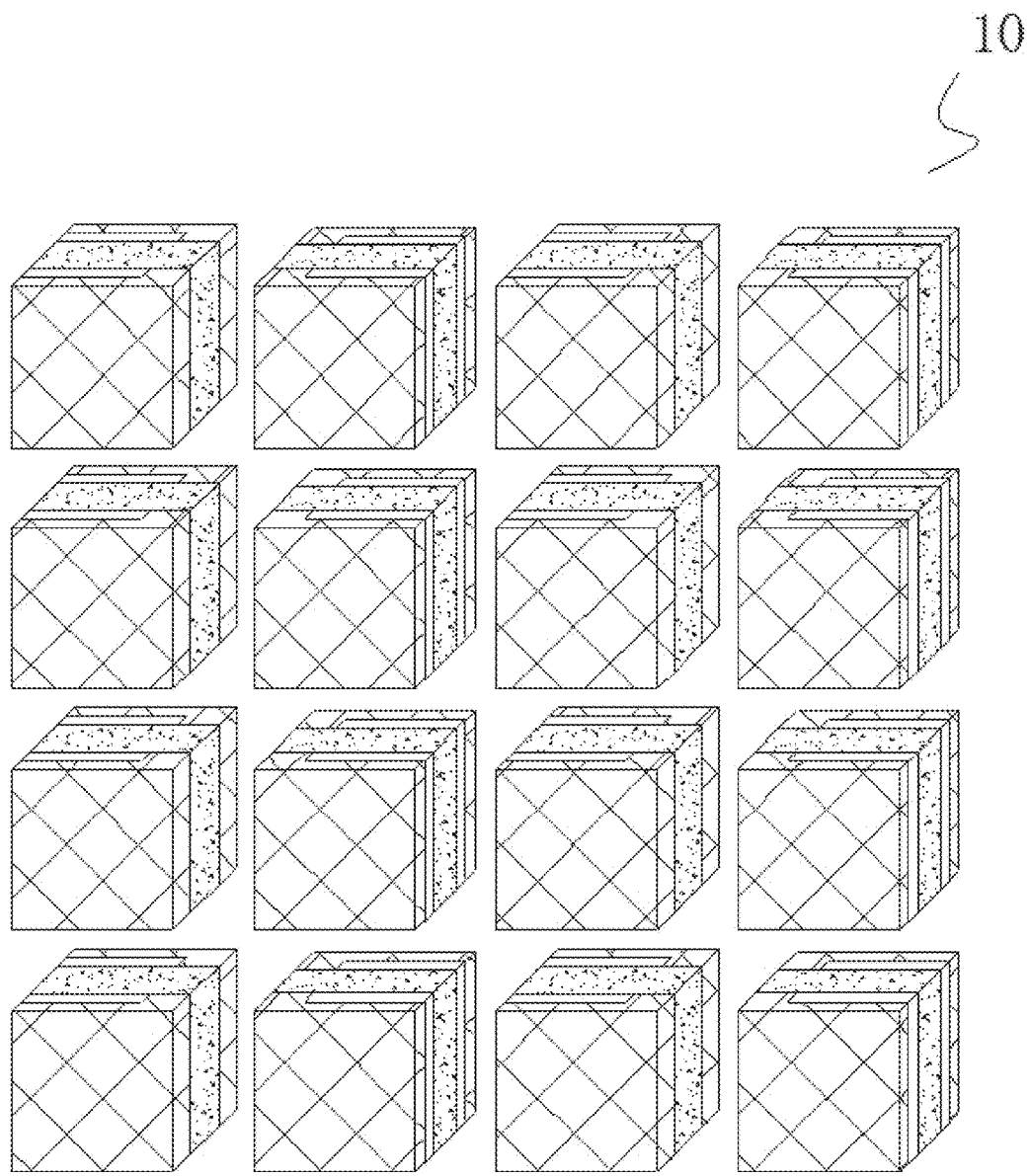

(5) to slice: as shown in FIG. 3E, the above mentioned thermosensitive ceramic semiconductor substrate having glass protective layers and metal electrode layers is sliced into square pieces according to the prescribed size.

Figure 3F:
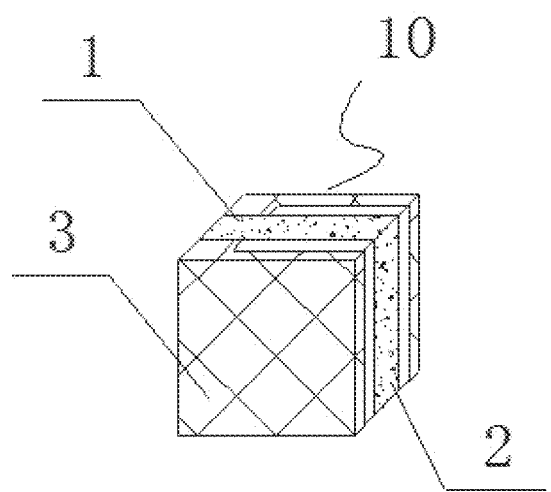

(6) to acquire thermosensitive chips; the structure of the thermosensitive chip 10 is as shown in FIG. 3F. Both the metal electrode layers 3 and the glass protective layers 2 are kept on each of the two surfaces of the thermosensitive ceramic semiconductor substrate 1 while slicing.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A thermosensitive chip, comprising:
a thermosensitive ceramic semiconductor substrate, wherein glass protective layers are spray-coated and sintered on two surfaces of the thermosensitive ceramic semiconductor substrate, and the two surfaces of the thermosensitive ceramic semiconductor substrate having the glass protective layers are printed with metal electrode layers;
wherein the two surfaces of the thermosensitive ceramic semiconductor substrate are partially covered by the glass protective layers, and the metal electrode layers completely cover surfaces of the glass protective layers and areas not covered by the glass protective layers on the two surfaces of the thermosensitive ceramic semiconductor substrate;

wherein a thickness of the metal electrode layers covering the two surfaces of the thermosensitive semiconductor ceramic substrate is larger than a thickness of the metal electrode layers covering the surfaces of the glass protective layers, so that a surface of the metal electrode layer is flat.

2. The thermosensitive chip of claim 1, wherein the metal electrode layers are gold or silver electrodes.

3. A manufacturing method of the thermosensitive chip of claim 1, comprising the following steps:
(1) providing the thermosensitive ceramic semiconductor substrate;
(2) spray-coat glass protective layers: spray-coat the two surfaces of the thermosensitive ceramic semiconductor substrate with glass liquid that made of glass powder correspondingly to form the glass protective layers, the glass protective layers are disposed on each of the two surfaces of the thermosensitive ceramic semiconductor substrate, the two surfaces of the thermosensitive ceramic semiconductor substrate are partially covered by the glass protective layers;
(3) sinter glass protective layers: sinter the thermosensitive ceramic semiconductor substrate that is spray-coated with the glass protective layers;
(4) print the metal electrode layers: print metal paste and sinter metal paste to form the metal electrode layers on the two surfaces of the thermosensitive ceramic semiconductor substrate having the glass protective layers, such that the metal electrode layers completely cover the surfaces of the glass protective layers and the areas not covered by the glass protective layers on the surfaces of the thermosensitive ceramic semiconductor substrate, and the thickness of the metal electrode layer covering the surface of the thermosensitive semiconductor ceramic substrate is larger than the thickness of the metal electrode layer covering the surface of the glass protective layer, so that the surface of the metal electrode layer is flat;
(5) slice the thermosensitive ceramic semiconductor substrate having the glass protective layers and the metal electrode layers into square pieces according to prescribed size; and
(6) arriving at thermosensitive chips.

4. A manufacturing method of the thermosensitive chip of claim 2, comprising the following steps:
(1) providing the thermosensitive ceramic semiconductor substrate;
(2) spray-coating the two surfaces of the thermosensitive ceramic semiconductor substrate with glass liquid that made of glass powder correspondingly to form the glass protective layers, the glass protective layers are disposed on each of the two surfaces of the thermosensitive ceramic semiconductor substrate, the surfaces of the thermosensitive ceramic semiconductor substrate are partially covered by the glass protective layers;
(3) sintering the thermosensitive ceramic semiconductor substrate that is spray-coated with the glass protective layers;
(4) printing the metal electrode layers: print metal paste and sinter metal paste to form the metal electrode layers on the two surfaces of the thermosensitive ceramic semiconductor substrate having the glass protective layers, such that the metal electrode layers completely cover the surfaces of the glass protective layers and the areas not covered by the glass protective layers on the surfaces of the thermosensitive ceramic semiconductor substrate, and the thickness of the metal electrode layer covering the surface of the thermosensitive semiconductor ceramic substrate is larger than the thickness of the metal electrode layer covering the surface of the glass protective layer, so that the surface of the metal electrode layer is flat;
(5) slicing the thermosensitive ceramic semiconductor substrate having the glass protective layers and the metal electrode layers into square pieces according to prescribed size; and
(6) arriving at thermosensitive chips.

5. The manufacturing method of the thermosensitive chip of claim 3, wherein step (2) spray-coat glass protective layers further comprises:
(2a) mounting the thermosensitive ceramic semiconductor substrate on a shielding bar to shield area that does not need to be spray-coated with glass; and
(2b) using a sprayer to spray-coat upper and lower surfaces of the mounted thermosensitive ceramic semiconductor substrate with prepared glass liquid that made of glass powder evenly.

6. The manufacturing method of the thermosensitive chip of claim 3, wherein the step (3) of sinter the glass protective layers further comprises: removing the shielding bar, sinter the spray-coated thermosensitive ceramic semiconductor substrate at a temperature to melt the glass powder, so that the glass and thermosensitive ceramic semiconductor substrate are tightly bonded.

7. The manufacturing method of the thermosensitive chip of claim 6, wherein a sintering temperature range of the glass protective layers is 600~650° C.

8. The manufacturing method of the thermosensitive chip of claim 3, wherein the step (4) print the metal electrode layers further comprises:
(4a) using a printing machine to print metal paste evenly on upper and lower surfaces of the thermosensitive ceramic semiconductor substrate having the glass protective layers;
(4b) sintering at a temperature such that the metal electrode layers are closely bonded to the glass protective layers and thermosensitive semiconductor ceramic layer.

9. The manufacturing method of the thermosensitive chip of claim 8, wherein a sintering temperature of the metal electrode layers is 950~1100° C.

* * * * *